United States Patent
Lee

(10) Patent No.: US 9,010,206 B2
(45) Date of Patent: Apr. 21, 2015

(54) AUTOMATED MANUAL TRANSMISSION

(75) Inventor: Yeon-Tae Lee, Gyeonggi-do (KR)

(73) Assignee: Hyundai Powertech Co., Ltd., Chungcheongnam-Do (KR)

( * ) Notice: Subject to any disclaimer, the term of this patent is extended or adjusted under 35 U.S.C. 154(b) by 0 days.

(21) Appl. No.: 14/235,677

(22) PCT Filed: Sep. 8, 2011

(86) PCT No.: PCT/KR2011/006671
§ 371 (c)(1),
(2), (4) Date: Jan. 28, 2014

(87) PCT Pub. No.: WO2013/018952
PCT Pub. Date: Feb. 7, 2013

(65) Prior Publication Data
US 2014/0174228 A1    Jun. 26, 2014

(30) Foreign Application Priority Data

Jul. 29, 2011 (KR) .................... 10-2011-0075581

(51) Int. Cl.
*F16H 3/08* (2006.01)
*F16H 3/00* (2006.01)
*F16H 3/093* (2006.01)

(52) U.S. Cl.
CPC ............ *F16H 3/08* (2013.01); *F16H 3/006* (2013.01); *F16H 2003/0931* (2013.01); *F16H 2200/0056* (2013.01)

(58) Field of Classification Search
CPC ......... F16H 3/006; F16H 3/008; F16H 3/085; F16H 3/093; F16H 3/095; F16H 2003/0931; F16H 2003/0933; F16H 2003/0826; F16H 2200/0056; F16H 2200/0052; F16D 21/06

USPC ............ 74/325, 330, 331, 332, 333, 339, 340
See application file for complete search history.

(56) References Cited

U.S. PATENT DOCUMENTS 4,388,838 A * 6/1983 Richards et al. ................ 74/331
5,125,282 A * 6/1992 Bender et al. .................. 74/359
(Continued)

FOREIGN PATENT DOCUMENTS

| JP | 2007-332991 A | 12/2007 |
|---|---|---|
| KR | 10-0569136 B1 | 4/2006 |
| KR | 10-0852044 B1 | 8/2008 |

OTHER PUBLICATIONS

International Search Report in International Application No. PCT/KR2011/006671, filed Sep. 8, 2011.

*Primary Examiner* — William Kelleher
*Assistant Examiner* — Jake Cook
(74) *Attorney, Agent, or Firm* — Saliwanchik, Lloyd & Eisenschenk

(57) ABSTRACT

An automated manual transmission is provided to implement seven forward gear changes and one reverse gear change. The automated manual transmission includes: a first input shaft; a second input shaft; a driving gear section mounted to the first and second input shafts; a clutch section for transmitting or blocking the power of the engine; a first output shaft to which the power is transmitted from the first input shaft or the second input shaft; a second output shaft to which the power is transmitted from the first input shaft or the second input shaft; a driven gear section including a plurality of driven gears which are mounted on the first output shaft and the second output shaft; and a synchronization section for connecting or disconnecting the first output shaft and the second output shaft. The clutch section includes a first clutch mounted to the first input shaft and a second clutch mounted to the second input.

7 Claims, 2 Drawing Sheets

(56) References Cited

U.S. PATENT DOCUMENTS

| | | | | |
|---|---|---|---|---|
| 5,592,854 | A * | 1/1997 | Alfredsson | 74/331 |
| 7,155,994 | B2 * | 1/2007 | Gumpoltsberger | 74/340 |
| 7,272,985 | B2 * | 9/2007 | Gumpoltsberger et al. | 74/331 |
| 7,597,020 | B2 * | 10/2009 | Baldwin | 74/336 R |
| 7,707,910 | B2 * | 5/2010 | Klement | 74/730.1 |
| 7,735,389 | B2 * | 6/2010 | Komori | 74/340 |
| 8,443,686 | B2 * | 5/2013 | Singh et al. | 74/330 |
| 2008/0196543 | A1 * | 8/2008 | Kobayashi et al. | 74/664 |
| 2010/0251840 | A1 * | 10/2010 | Mohlin et al. | 74/330 |
| 2010/0275707 | A1 | 11/2010 | Rieger | |
| 2011/0146445 | A1 * | 6/2011 | Silva et al. | 74/665 K |

\* cited by examiner

Fig. 2

|   | CLUTCH | | SYNCRO. position | | | | | | |
|---|---|---|---|---|---|---|---|---|---|
|   | C1 | C2 | I | II | III | IV | V | VI | R |
| 1 | ○ |   | ● | ● |   |   |   |   |   |
| 2 |   | ○ |   | ● |   |   |   |   |   |
| 3 | ○ |   |   |   | ● |   |   |   |   |
| 4 |   | ○ |   |   |   | ● |   |   |   |
| 5 | ○ |   |   |   |   |   | ● |   |   |
| 6 |   | ○ |   |   |   |   |   | ● |   |
| 7 |   | ○ | ● |   |   |   | ● |   |   |
| R | ○ |   | ● |   |   |   |   |   | ● |

AUTOMATED MANUAL TRANSMISSION

CROSS-REFERENCE TO RELATED APPLICATIONS

This application is the U.S. national stage application of International Patent Application No. PCT/KR2011/006671, filed Sep. 8, 2011, which claims priority to Korean Application No. 10-2011-0075581, filed Jul. 29, 2011, the disclosures of each of which are incorporated herein by reference in their entirety.

TECHNICAL FIELD

Exemplary embodiments of the present disclosure relate to an automated manual transmission, and more particularly, to an automated manual transmission which can realize multiple speed changes of at least 6 forward and 1 reverse speed changes.

BACKGROUND ART

An automated manual transmission refers to a transmission capable of achieving the advantages of a manual transmission and an automatic transmission, and provides advantages in that driving manipulation is convenient, acceleration is smoothly implemented and driving safety performance is high.

In the automated manual transmission, in order to realize automatic gear change, a hydraulic or electronic control system is installed.

While gear change is performed by the hydraulic or electronic control system, since the rotation force of an engine is not transferred to the transmission due to the operation of a clutch, a phenomenon occurs in which power transfer is interrupted.

After the gear change of the transmission is completed, the rotation force of the engine is transferred to the transmission due to the operation of the clutch. The rotation force of the engine is transferred to driving wheels by being increased or decreased according to a changed gear ratio.

The background art of the present disclosure is disclosed in Korean Unexamined Patent Publication No. 10-2011-0021120 (published on Mar. 4, 2011 and entitled 'Automated Manual Transmission').

DISCLOSURE

Technical Problem

In a conventional automated manual transmission, since a plurality of gears are installed between an input shaft and an output shaft and a synchromesh device for selectively gear-connecting the gears of the input shaft and the gears of the output shaft is installed, a problem is caused in that it is difficult to increase the number of speed change stages which can be realized by the automated manual transmission.

Therefore, it is necessary to cope with this problem.

An embodiment of the present disclosure relates to an automated manual transmission which can realize multiple speed changes of at least 6 forward and 1 reverse speed changes.

Technical Solution

In an embodiment, an automated manual transmission includes: a first input shaft to which power of an engine is transferred; a second input shaft to which the power of the engine is transferred; a driving gear section which is installed on the first input shaft and the second input shaft; a clutch section which allows or blocks transfer of the power of the engine to the first input shaft or the second input shaft; a first output shaft to which power is transferred from the first input shaft or the second input shaft; a second output shaft to which power is transferred from the first input shaft or the second input shaft and which includes a plurality of shafts arranged on the same axis; a driven gear section which includes a plurality of driven gears installed on the first output shaft and the second output shaft; and a synchromesh section which connects or disconnects the first output shaft or the second output shaft to and from the driven gear section and realizes multiple speed changes, the clutch section including a first clutch which is installed on the first input shaft and allows or blocks transfer of the power of the engine, and a second clutch which is installed on the second input shaft and allows or blocks transfer of the power of the engine.

The driving gear section includes a first driving gear which is installed on the first input shaft and transfers power; a second driving gear which is installed on the first input shaft and transfers power; a third driving gear which is installed on the second input shaft and transfers power; and a fourth driving gear which is installed on the second input shaft and transfers power, wherein the first driving gear, the second driving gear, the third driving gear and the fourth driving gear are connected with the driven gear section and form four gear trains.

The driven gear section includes a first driven gear which is rotatably connected to the second output shaft and is gear-connected to the first driving gear; a second driven gear which is rotatably connected to the first output shaft and is gear-connected to the first driving gear; a third driven gear which is rotatably connected to the first output shaft and is gear-connected to the second driving gear; a fourth driven gear which is rotatably connected to the first output shaft and is gear-connected to the third driving gear; a fifth driven gear which is rotatably connected to the second output shaft and is gear-connected to the third driving gear; a sixth driven gear which is rotatably connected to the first output shaft; and a seventh driven gear which is rotatably connected to the second output shaft and is gear-connected to the fourth driving gear and the sixth driven gear.

The second output shaft includes a front output shaft which has the seventh driven gear; and a rear output shaft which has the first driven gear and the fifth driven gear.

The synchromesh section includes a first synchromesh which is slideably installed on the first output shaft and is engaged with or disengaged from the fourth driven gear or the sixth driven gear; a second synchromesh which is slideably installed on the first output shaft and is engaged with or disengaged from the second driven gear or the third driven gear; a third synchromesh which is slideably installed on the second output shaft and is engaged with or disengaged from the fifth driven gear or the seventh driven gear; and a fourth synchromesh which is slideably installed on the second output shaft and is engaged with or disengaged from the first driven gear.

A first transfer gear which is gear-connected to a differential gear is installed on the first output shaft, and a second transfer gear which is gear-connected to the differential gear is installed on the front output shaft.

A speed change to a first forward speed is realized as the first clutch is operated, the fourth synchromesh is engaged with the first driven gear and the third synchromesh is engaged with the seventh driven gear, a speed change to a second forward speed is realized as the second clutch is operated and the third synchromesh is engaged with the seventh driven gear, a speed change to a third forward speed is realized as the first clutch is operated and the second synchromesh is engaged with the second driven gear, a speed change to a fourth forward speed is realized as the second clutch is operated and the first synchromesh is engaged with the fourth driven gear, a speed change to a fifth forward speed is realized as the first clutch is operated and the second synchromesh is engaged with the third driven gear, a speed change to a sixth forward speed is realized as the second clutch is operated and the third synchromesh is engaged with the fifth driven gear, a speed change to a seventh forward speed is realized as the second clutch is operated, the fourth synchromesh is engaged with the first driven gear and the second synchromesh is engaged with the third driven gear, and a speed change to a reverse speed is realized as the first clutch is operated, the fourth synchromesh is engaged with the first driven gear and the first synchromesh is engaged with the sixth driven gear.

Advantageous Effects

In the automated manual transmission according to the embodiment of the present disclosure, since four gear trains and four synchromesh sections are installed, multiple speed changes of at least 6 forward and 1 reverse speed changes, in detail, 7 forward and 1 reverse speed changes, may be realized, whereby advantages are provided in that the size and the weight of the automated manual transmission may be reduced.

DESCRIPTION OF DRAWINGS

The above and other aspects, features and advantages of the present disclosure will become apparent from the following detailed description in conjunction with the accompanying drawings, in which:

FIG. 2 is an operation element table of the clutch and the synchromesh section of the automated manual transmission in accordance with the embodiment of the present disclosure.

BEST MODE

Figure 1:
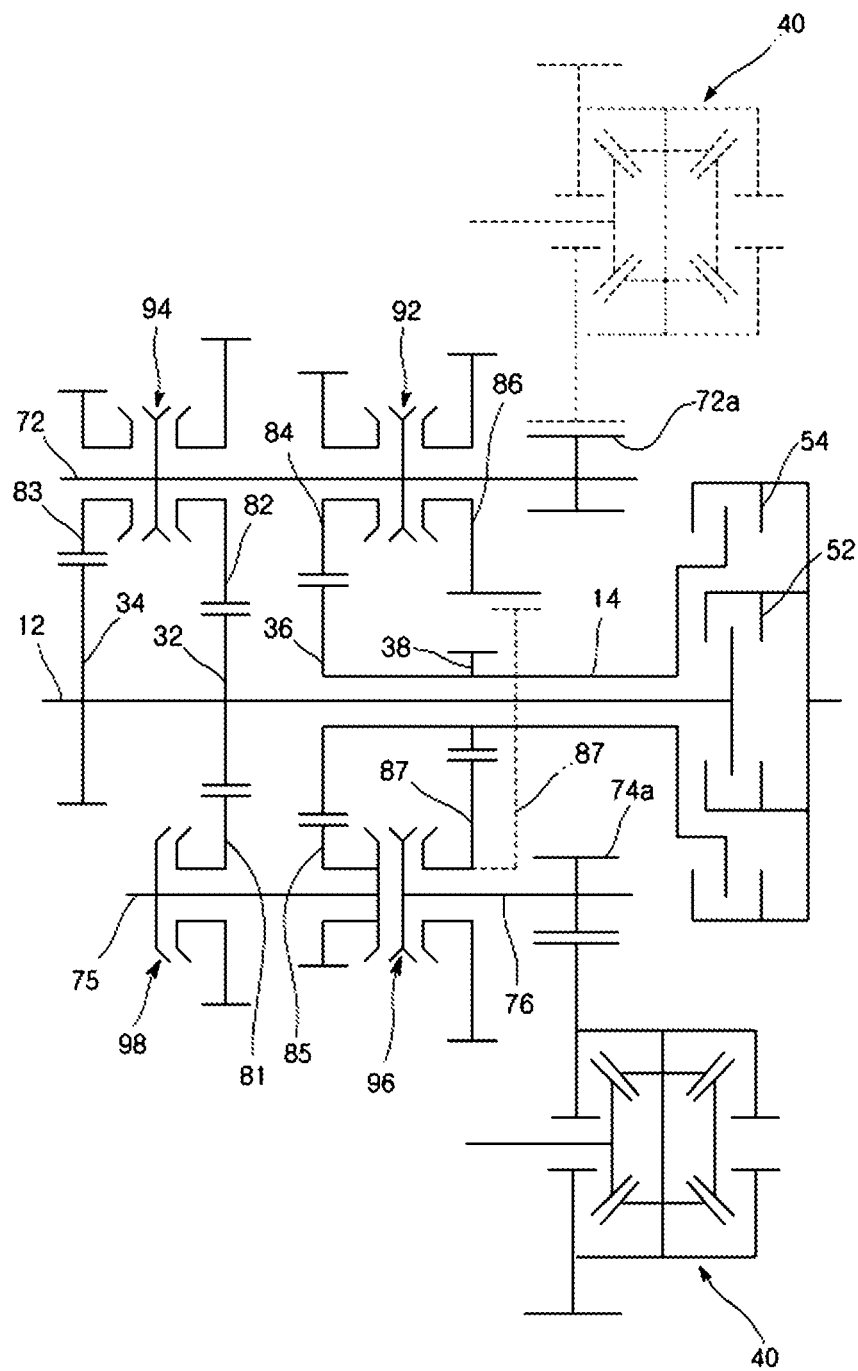
FIG. 1 is a construction view illustrating an automated manual transmission in accordance with an embodiment of the present disclosure.

Embodiments of the present disclosure will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the present disclosure into account and can be changed according to the custom or intention of users or operators. Therefore, definition of the terms should be made according to the overall disclosures set forth herein.

FIG. 1 is a construction view illustrating an automated manual transmission in accordance with an embodiment of the present disclosure, and FIG. 2 is an operation element table of the clutch and the synchromesh section of the automated manual transmission in accordance with the embodiment of the present disclosure.

Referring to FIGS. 1 and 2, an automated manual transmission in accordance with an embodiment of the present disclosure includes a first input shaft 12 to which the power of an engine is transferred, a second input shaft 14 to which the power of the engine is transferred, a driving gear section 34, 36 and 38 which is installed on the first input shaft 12 and the second input shaft 14, a clutch section 52 and 54 which allows or blocks the transfer of the power of the engine to the first input shaft 12 or the second input shaft 14, a first output shaft 72 to which power is transferred from the first input shaft 12 or the second input shaft 14, a second output shaft 75 and 76 to which power is transferred from the first input shaft 12 or the second input shaft 14, a driven gear section 81, 82, 83, 84, 85, 86 and 87 which is installed on the first output shaft 72 and the second output shaft 75 and 76, and a synchromesh section 92, 94, 96 and 98 which connects or disconnects the first output shaft 72 or the second output shaft 75 and 76 to and from the driven gear section 81, 82, 83, 84, 85, 86 and 87 and realizes 7 forward and 1 reverse speed changes.

As the power of the engine is transferred to the first input shaft 12 or the second input shaft 14 by the operation of the clutch section 52 and 54 and the power of the engine is transferred along the driving gear section 34, 34, 36 and 38 and the driven gear section 81, 82, 83, 84, 85, 86 and 87 by the operation of the synchromesh section 92, 94, 96 and 98, the 7 forward and 1 reverse speed changes are realized.

The clutch section 52 and 54 includes a first clutch 52 which is installed on the first input shaft 12 and allows or blocks the transfer of the power of the engine, and a second clutch 54 which is installed on the second input shaft 14 and allows or blocks the transfer of the power of the engine.

The first clutch 52 and the second clutch 54 are selectively operated according to an operation signal which is transmitted from a control unit. If the first clutch 52 is operated, the power of the engine is transferred to the first input shaft 12, and, if the second clutch 54 is operated, the power of the engine is transferred to the second input shaft 14.

The driving gear section 34, 34, 36 and 38 includes a first driving gear 32 which is installed on the first input shaft 12 and transfers the power of a first forward speed or a third forward speed, a second driving gear 34 which is installed on the first input shaft 12 and transfers the power of a fifth forward speed, a third driving gear 36 which is installed on the second input shaft 14 and transfers the power of a fourth forward speed or a sixth forward speed, and a fourth driving gear 38 which is installed on the second input shaft 14 and transfers the power of a second forward speed or a reverse speed.

In the case where the first clutch 52 is operated, as the power of the engine transferred along the first input shaft 12 passes through the first driving gear 32 and the driven gear section 81, 82, 85 and 87 by the operation of the synchromesh section 94, 96 and 98, a speed change to the first forward speed or the third forward speed is realized.

Also, in the case where the first clutch 52 is operated, as the power of the engine transferred along the first input shaft 12 passes through the second driving gear 34 and the driven gear section 83 by the operation of the synchromesh section 94, a speed change to the fifth forward speed is realized.

In the case where the second clutch 54 is operated, as the power of the engine transferred along the second input shaft 14 passes through the third driving gear 36 and the driven gear section 84 and 85 by the operation of the synchromesh section 92 and 96, a speed change to the fourth forward speed or the sixth forward speed is realized.

Also, in the case where the second clutch 54 is operated, as the power of the engine transferred along the second input shaft 14 passes through the fourth driving gear 38 and the driven gear section 86 and 87 by the operation of the synchromesh section 92 and 96, a speed change to the second forward speed or the reverse speed is realized.

Further, in the case where the second clutch 54 is operated, as the power of the engine transferred along the second input shaft 14 passes through the third driving gear 36 and the driven gear section 81, 83 and 85 by the operation of the synchromesh section 94 and 98, a speed change to the seventh forward speed is realized.

The driven gear section 81, 82, 83, 84, 85, 86 and 87 includes a first driven gear 81 which is rotatably connected to the second output shaft 75 and is gear-connected to the first driving gear 32, a second driven gear 82 which is rotatably connected to the first output shaft 72 and is gear-connected to the first driving gear 32, a third driven gear 83 which is rotatably connected to the first output shaft 72 and is gear-connected to the second driving gear 34, a fourth driven gear 84 which is rotatably connected to the first output shaft 72 and is gear-connected to the third driving gear 36, a fifth driven gear 85 which is rotatably connected to the second output shaft 75 and is gear-connected to the third driving gear 36, a sixth driven gear 86 which is rotatably connected to the first output shaft 72, and a seventh driven gear 87 which is rotatably connected to the second output shaft 76 and is gear-connected to the fourth driving gear 38 and the sixth driven gear 86.

The synchromesh section 92, 94, 96 and 98 includes a first synchromesh 92 which is slideably installed on the first output shaft 72 and is engaged with or disengaged from the fourth driven gear 84 or the sixth driven gear 86, a second synchromesh 94 which is slideably installed on the first output shaft 72 and is engaged with or disengaged from the second driven gear 82 or the third driven gear 83, a third synchromesh 96 which is slideably installed on the second output shaft 76 and is engaged with or disengaged from the fifth driven gear 85 or the seventh driven gear 87, and a fourth synchromesh 98 which is slideably installed on the second output shaft 75 and is engaged with or disengaged from the first driven gear 81.

If the first synchromesh 92 is engaged with the fourth driven gear 84, the power of the engine transferred from the third driving gear 36 is transferred to the first output shaft 72 through the fourth driven gear 84, and, if the first synchromesh 92 is engaged with the sixth driven gear 86, the power of the engine transferred from the fourth driving gear 38 is transferred to the first output shaft 72 through the sixth driven gear 86.

If the second synchromesh 94 is engaged with the second driven gear 82, the power of the engine transferred from the first driving gear 32 is transferred to the first output shaft 72 through the second driven gear 82, and, if the second synchromesh 94 is engaged with the third driven gear 83, the power of the engine transferred from the second driving gear 34 is transferred to the first output shaft 72 through the third driven gear 83.

If the third synchromesh 96 is engaged with the fifth driven gear 85, the power of the engine transferred from the third driving gear 36 is transferred to the second output shaft 75 through the fifth driven gear 85, and, if the third synchromesh 96 is engaged with the seventh driven gear 87, the power of the engine transferred from the fourth driving gear 38 is transferred to the second output shaft 76 through the seventh driven gear 87.

If the fourth synchromesh 98 is engaged with the first driven gear 81, the power of the engine transferred from the first driving gear 32 is transferred to the second output shaft 75 through the first driven gear 81.

Since a first transfer gear 72a which is gear-connected to a differential gear 40 is installed on the first output shaft 72, the power of the engine transferred to the first output shaft 72 is transferred to the differential gear 40 through the first transfer gear 72a.

The second output shaft 75 and 76 includes a front output shaft 76 which has a second transfer gear 74a gear-connected to the differential gear 40, the seventh driven gear 87 and the third synchromesh 96, and a rear output shaft 75 which has the first driven gear 81, the fifth driven gear 85 and the fourth synchromesh 98.

Operations of the automated manual transmission in accordance with the embodiment of the present disclosure, constructed as mentioned above, will be described below.

In the case where driving of a vehicle is started and the speed change to the first forward speed is realized, the first clutch 52 is operated, the fourth synchromesh 98 is engaged with the first driven gear 81, and the third synchromesh 96 is engaged with the seventh driven gear 87.

Accordingly, the power of the engine transferred to the first input shaft 12 through the first clutch 52 is transferred to the differential gear 40 by passing through the first driving gear 32, the first driven gear 81, the rear output shaft 75, the fifth driven gear 85, the third driving gear 36, the fourth driving gear 38, the seventh driven gear 87, the front output shaft 76 and the second transfer gear 74a.

In the case where the speed change to the second forward speed is realized, the second clutch 54 is operated, and the third synchromesh 96 is engaged with the seventh driven gear 87.

Accordingly, the power of the engine transferred to the second input shaft 14 through the second clutch 54 is transferred to the differential gear 40 by passing through the fourth driving gear 38, the seventh driven gear 87, the front output shaft 76 and the second transfer gear 74a.

In the case where the speed change to the third forward speed is realized, the first clutch 52 is operated, and the second synchromesh 94 is engaged with the second driven gear 82.

Accordingly, the power of the engine transferred to the first input shaft 12 through the first clutch 52 is transferred to the differential gear 40 by passing through the first driving gear 32, the second driven gear 82, the first output shaft 72 and the first transfer gear 72a.

In the case where the speed change to the fourth forward speed is realized, the second clutch 54 is operated, and the first synchromesh 92 is engaged with the fourth driven gear 84.

Accordingly, the power of the engine transferred to the second input shaft 14 through the second clutch 54 is transferred to the differential gear 40 by passing through the third driving gear 36, the fourth driven gear 84, the first output shaft 72 and the first transfer gear 72a.

In the case where the speed change to the fifth forward speed is realized, the first clutch 52 is operated, and the second synchromesh 94 is engaged with the third driven gear 83.

Accordingly, the power of the engine transferred to the first input shaft 12 through the first clutch 52 is transferred to the differential gear 40 by passing through the second driving gear 34, the third driven gear 83, the first output shaft 72 and the first transfer gear 72a.

In the case where the speed change to the sixth forward speed is realized, the second clutch 54 is operated, and the third synchromesh 96 is engaged with the fifth driven gear 85.

Accordingly, the power of the engine transferred to the second input shaft 14 through the second clutch 54 is transferred to the differential gear 40 by passing through the third driving gear 36, the fifth driven gear 85, the front output shaft 76 and the second transfer gear 74a.

In the case where the speed change to the seventh forward speed is realized, the second clutch 54 is operated, the fourth synchromesh 98 is engaged with the first driven gear 81, and the second synchromesh 94 is engaged with the third driven gear 83.

Accordingly, the power of the engine transferred to the second input shaft 14 through the second clutch 54 is transferred to the differential gear 40 by passing through the third driving gear 36, the fifth driven gear 85, the rear output shaft 75, the first driven gear 81, the first input shaft 12, the second driving gear 34, the third driven gear 83, the first output shaft 72 and the first transfer gear 72a.

In the case where the speed change to the reverse speed is realized, the first clutch 52 is operated, the fourth synchromesh 98 is engaged with the first driven gear 81, and the first synchromesh 92 is engaged with the sixth driven gear 86.

Accordingly, the power of the engine transferred to the first input shaft 12 through the first clutch 52 is transferred to the differential gear 40 by passing through the first driving gear 32, the first driven gear 81, the rear output shaft 75, the fifth driven gear 85, the third driving gear 36, the second input shaft 14, the fourth driving gear 38, the seventh driven gear 87, the sixth driven gear 86, the first output shaft 72 and the first transfer gear 72a.

In this way, it is possible to provide an automated manual transmission which can realize 7 forward and 1 reverse speed changes.

Although some embodiments have been provided to illustrate the present disclosure in conjunction with the drawings, it will be apparent to those skilled in the art that the embodiments are given by way of illustration only, and that various modifications and equivalent embodiments can be made without departing from the spirit and scope of the present disclosure. The scope of the present disclosure should be limited only by the accompanying claims.

While an automated manual transmission for a vehicle has been exemplarily described above, this is for an illustration purpose only, and the automated manual transmission of the present disclosure may be applied to products other than a vehicle.

The invention claimed is:

1. An automated manual transmission comprising:
a first input shaft to which power of an engine is transferred;
a second input shaft to which the power of the engine is transferred;
a driving gear section which is installed on the first input shaft and the second input shaft;
a clutch section which allows or blocks transfer of the power of the engine to the first input shaft or the second input shaft;
a first output shaft to which power is transferred from the first input shaft or the second input shaft;
a second output shaft to which power is transferred from the first input shaft or the second input shaft and which includes a plurality of shafts arranged on the same axis;
a driven gear section which includes a plurality of driven gears installed on the first output shaft and the second output shaft; and
a synchromesh section which connects or disconnects the first output shaft or the second output shaft to and from the driven gear section and realizes multiple speed changes, the clutch section comprising:
a first clutch which is installed on the first input shaft and allows or blocks transfer of the power of the engine; and
a second clutch which is installed on the second input shaft and allows or blocks transfer of the power of the engine;
wherein the synchromesh section comprises a first, a second, a third, and a fourth synchromeshes; wherein the driven gear section comprises a first, a second, a third, a fourth, a fifth, a sixth, and a seventh driven gears;
wherein a speed change to a first forward speed is realized as the first clutch is operated, the fourth synchromesh is engaged with the first driven gear, and the third synchromesh is engaged with the seventh driven gear; and
wherein a speed change to a reverse speed is realized as the first clutch is operated, the fourth synchromesh is engaged with the first driven gear, and the first synchromesh is engaged with the sixth driven gear.

2. The automated manual transmission according to claim 1, wherein the driving gear section comprises:
a first driving gear which is installed on the first input shaft and transfers power;
a second driving gear which is installed on the first input shaft and transfers power;
a third driving gear which is installed on the second input shaft and transfers power; and
a fourth driving gear which is installed on the second input shaft and transfers power,
wherein the first driving gear, the second driving gear, the third driving gear and the fourth driving gear are connected with the driven gear section and form four gear trains.

3. The automated manual transmission according to claim 2, wherein the driven gear section comprises: the first driven gear which is rotatably connected to the second output shaft and is gear-connected to the first driving gear; the second driven gear which is rotatably connected to the first output shaft and is gear-connected to the first driving gear; the third driven gear which is rotatably connected to the first output shaft and is gear-connected to the second driving gear; the fourth driven gear which is rotatably connected to the first output shaft and is gear-connected to the third driving gear; the fifth driven gear which is rotatably connected to the second output shaft and is gear-connected to the third driving gear; the sixth driven gear which is rotatably connected to the first output shaft; and the seventh driven gear which is rotatably connected to the second output shaft and is gear-connected to the fourth driving gear and the sixth driven gear.

4. The automated manual transmission according to claim 3, wherein the second output shaft comprises:
a front output shaft which has the seventh driven gear; and
a rear output shaft which has the first driven gear and the fifth driven gear.

5. The automated manual transmission according to claim 4, wherein the synchromesh section comprises: the first synchromesh which is slidably installed on the first output shaft and is engaged with or disengaged from the fourth driven gear or the sixth driven gear; the second synchromesh which is slidably installed on the first output shaft and is engaged with or disengaged from the second driven gear or the third driven gear; the third synchromesh which is slidably installed on the second output shaft and is engaged with or disengaged from the fifth driven gear or the seventh driven gear; and the fourth synchromesh which is slidably installed on the second output shaft and is engaged with or disengaged from the first driven gear.

6. The automated manual transmission according to claim 5, wherein a first transfer gear which is gear-connected to a differential gear is installed on the first output shaft, and a second transfer gear which is gear-connected to the differential gear is installed on the front output shaft.

7. The automated manual transmission according to claim 6, wherein a speed change to a second forward speed is realized as the second clutch is operated and the third synchromesh is engaged with the seventh driven gear, a speed change to a third forward speed is realized as the first clutch is operated and the second synchromesh is engaged with the second driven gear, a speed change to a fourth forward speed is realized as the second clutch is operated and the first synchromesh is engaged with the fourth driven gear, a speed change to a fifth forward speed is realized as the first clutch is operated and the second synchromesh is engaged with the third driven gear, a speed change to a sixth forward speed is realized as the second clutch is operated and the third synchromesh is engaged with the fifth driven gear, and a speed change to a seventh forward speed is realized as the second clutch is operated, the fourth synchromesh is engaged with the first driven gear and the second synchromesh is engaged with the third driven gear.

\* \* \* \* \*